Dec. 12, 1939.  G. A. LYON  2,182,898
AUXILIARY IMPACT MEMBER
Filed Oct. 20, 1937
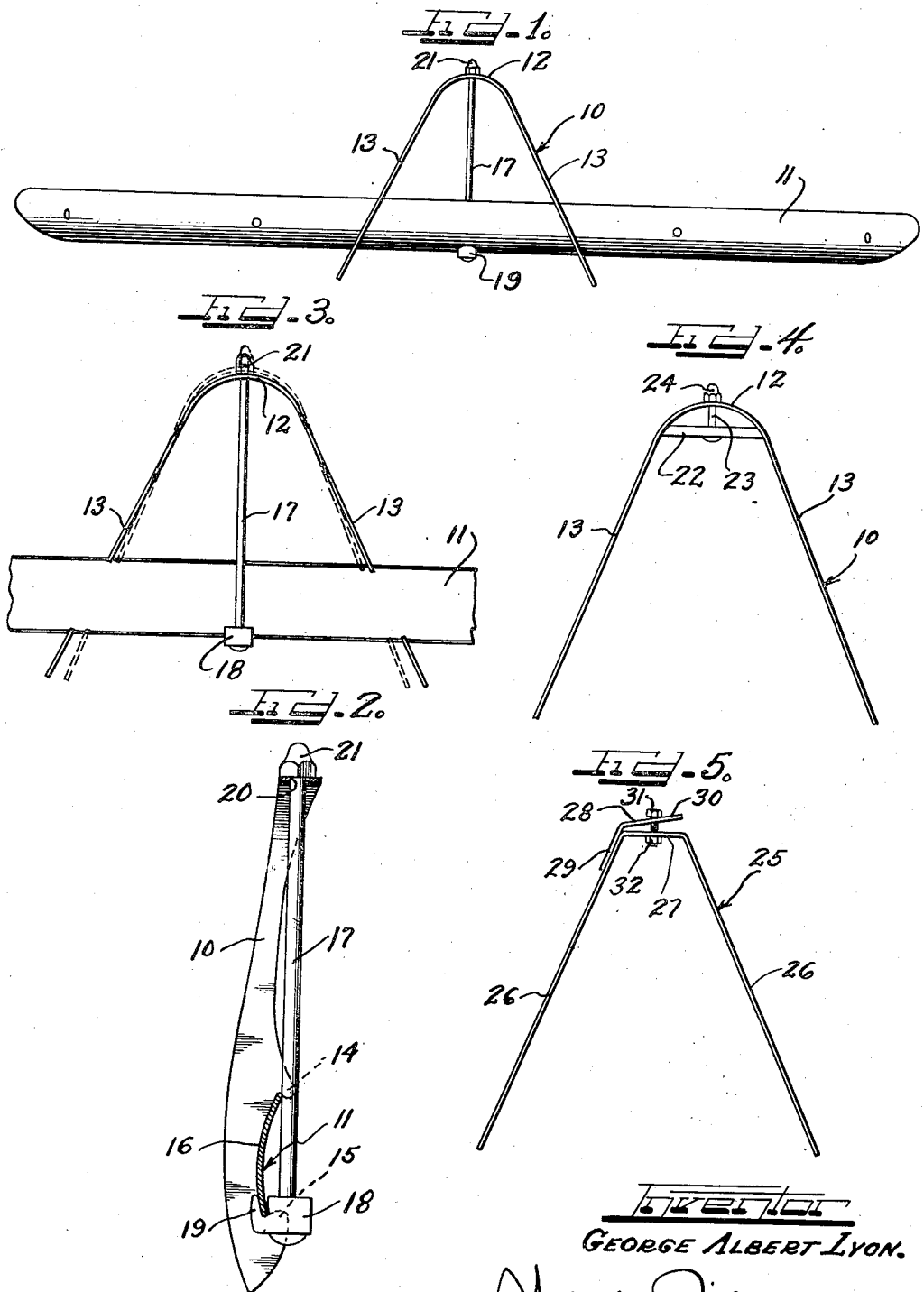
Inventor
GEORGE ALBERT LYON
by Charles... Attys.

Patented Dec. 12, 1939

2,182,898

UNITED STATES PATENT OFFICE 2,182,898

AUXILIARY IMPACT MEMBER

George Albert Lyon, Allenhurst, N. J.

Application October 20, 1937, Serial No. 170,034

14 Claims. (Cl. 293—55)

This invention relates to an ornamental auxiliary impact member, and more particularly to an accessory which will increase the protection afforded by the bumper and which may be detachably secured to a bumper without drilling holes in the latter or otherwise altering or marring its construction.

Although the usual vehicle bumper or impact member, which is universally employed on automobiles of the present day, is satisfactory under most circumstances, it has been found that in many instances it is desirable to increase the protection which is afforded by the bumper impact member by mounting thereon an auxiliary guard or impact member which extends centrally upwardly from the main bumper. This has been found to be particularly desirable where a cast grille radiator front is used on the vehicle. The increased protection which is afforded by the auxiliary impact member prevents overhanging objects or unusually high bumpers on other vehicles from riding over the top of the main bumper and breaking the relatively expensive cast grille radiator front or other expensive parts of the automobile. In view of the fact that the auxiliary impact member can only be secured at its lower end, it is highly important that it be constructed of material which is sufficiently strong to resist the usual impact to which a vehicle bumper is subjected, and also be secured to the vehicle bumper in such a manner that it cannot be ripped off. From a commercial standpoint, it is also desirable that the auxiliary impact member or guard be equipped with a mounting means which will permit the impact member or guard to be readily and quickly mounted on a vehicle bumper, and preferably without altering the form and construction of the bumper. The last feature permits the auxiliary guard or impact member to be mounted on vehicle bumpers which are already in use.

It is an object of this invention to provide a novel ornamental auxiliary impact member having the above highly desirable characteristics.

Another object of this invention is to provide a novel auxiliary impact member which is economical to manufacture, which is rugged and reliable in use, and which may readily and quickly be assembled on a vehicle bumper.

A further object of this invention is to provide a novel bumper accessory or impact member which may be detachably mounted on a vehicle bumper by means carried solely by the auxiliary impact member.

A still further object of this invention is to provide novel means for detachably securing an auxiliary impact member to a vehicle bumper or other cross bar.

Another and further object of this invention is to provide a novel auxiliary impact member having downwardly extending legs, each of the legs having a pair of complementary obliquely rearwardly extending feet thereon for overlapping and underlapping the upper and lower edges respectively of a vehicle bumper member having additional means for effecting and maintaining an engagement between said feet and the vehicle bumper.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1 is a front elevational view of a bumper having an ornamental auxiliary impact member mounted thereon which embodies the features of the present invention;

Figure 2 is a side elevational view, partly in cross-section, of the auxiliary impact member and bumper of Figure 1;

Figure 3 is a rear elevational view of the impact member of Figure 1 illustrating the manner in which it is detachably secured to the vehicle bumper;

Figure 4 illustrates a modified form of ornamental auxiliary impact member; and, Figure 5 illustrates a further embodiment of the ornamental auxiliary impact member.

In Figures 1 to 3 of the drawing, an embodiment of this invention is illustrated which includes an inverted V-shaped impact member 10 mounted on a vehicle bumper 11. The impact member 10 is preferably formed of yieldable or flexible steel stock but note should be taken that it is not necessary that the stock be resilient such as spring steel. As may be seen from the drawing, the impact member 10 includes a central or bow portion 12 and two downwardly extending diverging legs 13, which are arranged to overlie the front face of bumper 11. Each of the legs 13 near its lower end, is provided wtih a pair of complementary obliquely rearwardly converging teeth 14 and 15 and the portion of the legs 13 between teeth 14 and 15 is cut or otherwise formed to intimately overlie the front face of bumper 11, as is indicated at 16 in Figure 2.

As will at once be observed from a cursory inspection of Figures 2 and 3 of the drawing, complementary teeth 14 and 15 of each leg 13 are spaced so that the minimum distance between each tooth 14 and its complementary tooth 15 is greater than the vertical width of bumper 11. The impact member 10 is retained in desired position on bumper 11 by virtue of the fact that the vertical distance between each tooth 14 and its complementary tooth 15 is less than the vertical width dimension of the bumper 11 when in its assembled position as shown in Figure 3. It will therefore be understood that if some means is provided for maintaining the legs 13 in their angular position as shown by the full lines in Figure 3 the impact member 10 will be firmly secured to the bumper 11. The manner in which the legs 13 are maintained in this position will now be described.

A clamping rod 17 is provided for impact member 10 which extends upwardly behind the bumper bar 11 into engagement with the central or bow portion 12 of the impact member 10. More specifically, the clamping rod 17 is provided with a hook-shaped member 18 at its lower end which has an outwardly and then upwardly extending tongue portion 19 which extends under the lower edge of the bumper bar 11 and into engagement with the front face thereof. (See Figure 2.) Member 18 may be secured to clamping rod 17 in any suitable manner such as by welding or the like. The upper end of clamping rod 17 extends through an aperture 20 in the central or bow portion 12 of impact member 10 and is threaded near its extremity for the reception of a clamping nut 21.

The manner in which the impact member 10 is detachably secured to the bumper bar 11 will now be described.

The lower ends of each leg 13 of impact member 10 are gripped and moved together until the vertical distance between the tip of the complementary teeth 14 and 15 is greater than the vertical width dimension of the bumper bar 11. The curved edge portion 16 of leg 13 is then moved into position against the front face of bumper bar 11, the complementary teeth 14 and 15 passing over and under the upper and lower edges respectively of the bumper. The legs 13 are then pulled apart until they assume approximately the positions shown by the dotted lines in Figure 3. The clamping rod 17 is then inserted into the assembly by hooking the upturned tongue 19 under the lower edge of the bumper 11 and passing the upper end of the clamping rod 17 through the aperture 20 of the bow portion 12 of impact member 10. Clamping nut 21 is then screwed on the threaded end of rod 17 and tightened with a suitable wrench or other tool. From an inspection of Figure 3 of the drawing, it will be observed that as the nut 21 is tightened the central portion 12 of impact member 10 is forced downwardly from the dotted line position to the full line position in Figure 3. This causes the outwardly diverging legs 13 to spread further apart at a greater angle to the vertical which in turn effects a very tight engagement of the complementary teeth 14 and 15 on each leg 13 with the bumper 11. To remove the auxiliary impact member 10 from the bumper 11 it is simply necessary to loosen nut 21, remove the clamping rod 17 from the assembly, and flex the legs 13 together until the complementary teeth 14 and 15 are free to pass over and under the upper and lower edges respectively of bumper 11.

In Figure 4 a modified form of the invention is shown in which the clamping tongue 19 has been eliminated and in which the clamping rod 17 is greatly shortened. More specifically, means is provided in the form of the invention shown in Figure 4 for forcing the downwardly diverging legs 13 of impact member 10 outwardly which include a spacer member 22 which extends between legs 13 and a clamping rod 23 carried by the spacer member 22 which extends through a suitable aperture in the central portion 12 of the impact member 10 into engagement with a clamping nut 24. As will at once be understood from an inspection of Figure 4, a tightening of the clamping nut 24 will cause the spacer member 22 to move upwardly. Due to the fact that the legs 13 are converging at this point, upward movement of the spacing member 22 will cause the legs 13 to move further apart. Since the moving of legs 13 further apart is all that is necessary to effect a tight clamping engagement of the impact member 10 to the bumper 11 it will readily be apparent that the modified form of the invention shown in Figure 4 may be detachably secured to a bumper 11 in a manner similar to that described in connection with the preferred embodiment of the invention.

In Figure 5 another form of the invention is shown in which a single V-shaped impact member 25 having downwardly diverging legs 26 and a central flat portion 27 is detachably secured to a bumper 11 in a manner similar to that described in connection with the preferred embodiment of the invention. The lower ends of the legs 26 are formed in precisely the same manner as the lower ends of the legs 13 in Figure 2. Secured to the upper end of one of the legs however is a rigid arm 28 having a tail portion 29 which is welded to the impact member 25 in the position shown in Figure 5. Rigid arm 28 is provided with a free end portion 30 which is angularly spaced with respect to the flat central portion 27 of impact member 25. Free end portion 30 of arm 28 and central portion 27 of the impact member 25 are each provided with an aperture through which a clamping bolt 31 extends. A clamping nut 32 is provided for threaded engagement with the lower end of the clamping bolt 31.

As previously pointed out, a firm and suitable engagement of the impact member 25 with the bumper 11 may be obtained by effecting a spreading of the legs 26 after the complementary teeth 14 and 15 have been passed over the upper and lower edges respectively of the bumper 11. The manner in which the legs 26 of impact member 25 are forced apart is by virtue of the fact that if the free end 30 of rigid arm 28 is forced closer to the flat central portion 27 of the impact member 25 then the legs 26 will be forced further apart. It will thus readily be understood that as nut 32 is tightened on clamping bolt 31, free end 30 of rigid arm 28 is brought closer to the flat central portion 27 and the left leg 26 as viewed in Figure 5 is pulled farther away from the right leg 26.

From the above description, it will be seen that I have provided an extraordinarily simple and yet effective auxiliary impact member or bumper guard which may be economically manufactured, readily and quickly mounted by an unskilled person on a vehicle bumper, and which is rugged and reliable in use.

While I have shown a particular embodiment of my invention, it will of course be understood that I do not wish to be limited thereto since many modifications may be made, and I therefore contemplate by the appended claims to cover all such modifications as fall within the true spirit and scope of my invention.

I claim as my invention:

1. As an article of manufacture for vehicle bumpers, an auxiliary impact member comprising a single inverted V-shaped member having downwardly diverging legs arranged to extend across a vehicle bumper, means on said legs extending over and under the upper and lower edges respectively of said bumper, and means for urging said legs further apart.

2. As an article of manufacture for vehicle bumpers, an auxiliary impact member comprising a single inverted V-shaped member having downwardly diverging legs arranged to extend across a vehicle bumper, means on said legs extending over and under the upper and lower edges respectively of said bumper, and means engageable with said bumper and with said V-shaped member for urging said legs further apart.

3. As an article of manufacture for vehicle bumpers, an auxiliary impact member comprising a single inverted V-shaped member having downwardly diverging legs arranged to extend across a vehicle bumper, means on said legs extending over and under the upper and lower edges respectively of said bumper, and means engageable solely with said V-shaped member for urging said legs further apart.

4. As an article of manufacture for vehicle bumpers, an auxiliary impact member comprising a single inverted V-shaped member having downwardly diverging legs arranged to extend across the vehicle bumper, each of said legs having a pair of complementary teeth thereon extending around the upper and lower edges of said bumper for securing said member thereto, and a clamping member for pulling the central portion of said inverted V-shaped member closer to said bumper.

5. As an article of manufacture for vehicle bumpers, an auxiliary impact member comprising a single inverted V-shaped member having downwardly diverging legs arranged to extend across the vehicle bumper, each of said legs having a pair of complementary teeth thereon extending around the upper and lower edges of said bumper for securing said member thereto, and a clamping member engageable with said bumper and with the central portion of said V-shaped member for urging said legs apart.

6. As an article of manufacture for vehicle bumpers, an auxiliary impact member comprising a single inverted V-shaped member having downwardly diverging legs arranged to extend across the vehicle bumper, each of said legs having a pair of complementary teeth thereon extending around the upper and lower edges of said vehicle bumper for securing said member thereto, and a clamping member having an upturned prong adjacent its lower extremity for hooking under said bumper, the upper end of said clamping member having a threaded portion, and a complementary clamping nut engageable with the upper side of said V-shaped member and with the threaded portion of said clamping member, the legs of said V-shaped member being adapted to be pressed further apart upon tightening of said nut.

7. As an article of manufacture for vehicle bumpers, an auxiliary impact member comprising a single inverted V-shaped member having downwardly diverging legs arranged to extend across a vehicle bumper, each of said legs having a pair of complementary teeth thereon extending around the upper and lower edges of said vehicle bumper for securing said member thereto, a spacing member extending between said legs in proximity to their upper portion and making a frictional engagement therewith, and means for moving said spacing member upwardly towards the apex of said inverted V-shaped member, whereby said legs are spread further apart and said teeth are forced into tight engagement with said bumper.

8. As an article of manufacture for vehicle bumpers, an auxiliary impact member comprising a single inverted V-shaped member having downwardly diverging legs arranged to extend across a vehicle bumper, each of said legs having a pair of complementary teeth thereon extending around the upper and lower edges of said vehicle bumper for securing said member thereto, a spacing member extending between said legs in proximity to their upper portion and making a frictional engagement therewith, and a clamping rod carried by said spacing member extending upwardly into engagement with the central portion of said inverted V-shaped member adjacent the apex thereof, said clamping arm having a threaded end, and a clamping nut engageable with said threaded end and with said V-shaped member, whereby the tightening of said nut forces said spacing member upwardly toward the apex of said V-shaped member and spreads said legs further apart.

9. As an article of manufacture for vehicle bumpers, an auxiliary impact member comprising a single inverted V-shaped member having downwardly diverging legs arranged to extend across the vehicle bumper, each of said legs having a pair of complementary teeth thereon extending around the upper and lower edges of said bumper for securing said member thereto, a rigid arm secured to one of said legs adjacent the apex of said V-shaped member, said rigid arm having a free end extending over the central portion of said inverted V-shaped member in angular spaced relation thereto, and means for pulling said free end of said rigid arm closer to said central portion of said member, whereby the said legs are urged further apart.

10. As an article of manufacture for vehicle bumpers, an auxiliary impact member comprising a single inverted bow-shaped member having legs extending downwardly across the vehicle bumper, means on said legs extending over and under the upper and lower edges respectively of said bumper, and means for urging the central portion of said bow-shaped member toward said bumper.

11. As an article of manufacture for vehicle bumpers, an auxiliary impact member comprising a single inverted bow-shaped member having legs extending downwardly across the vehicle bumper, each of said legs having a pair of complementary teeth thereon extending around the upper and lower edges of said vehicle bumper for securing said member thereto, and means for pulling the central portion of said bow-shaped member toward said bumper.

12. The combination comprising a horizontally extending bumper bar, a one-piece vertical interlock preventing guard having portions extending above and below the upper and lower edges respectively of said bumper, and means for securing said guard to said bumper including means for displacing said upper and lower portions of said guard with respect to each other in the direction of the length of said bumper.

13. The combination comprising a horizontally extending bumper bar, a one-piece vertical interlock preventing guard having obliquely rearwardly converging portions passing over and under the upper and lower edges respectively of said bumper bar, and means for displacing said upper and lower portions in the direction of the length of the bumper with respect to each other, whereby said obliquely rearwardly converging portions are maintained in tight engagement on said bumper bar.

14. In combination with a vehicle bumper, a one-piece auxiliary impact member having a pair of legs extending downwardly across said vehicle bumper, means on said legs extending over and under the upper and lower edges respectively of said bumper, and means for angularly moving said legs with respect to said bumper, whereby said first means makes a tight engagement with said bumper.

GEORGE ALBERT LYON.